Figure 1:
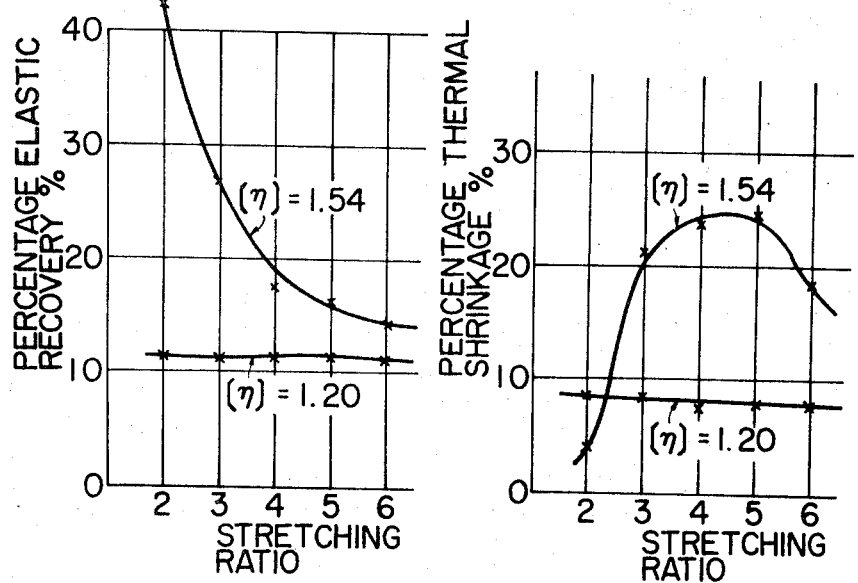

United States Patent
Eshima et al.

[15] 3,657,062
[45] Apr. 18, 1972

[54] CRIMPABLE, COLORED POLYPROPYLENE COMPOSITE FIBERS

[72] Inventors: Shozo Eshima; Isao Fujimura; Hidenori Nakagawa, all of Shigaken, Japan

[73] Assignee: Chisso Corporation, Osaka, Japan

[22] Filed: Jan. 23, 1970

[21] Appl. No.: 5,291

[30] Foreign Application Priority Data

Jan. 31, 1969 Japan......................................44/7185

[52] U.S. Cl..............................161/173, 161/174, 161/175
[51] Int. Cl. .......................................................D01d 5/28
[58] Field of Search ..........................161/173, 174, 177, 172

[56] References Cited

UNITED STATES PATENTS

| | | | |
|---|---|---|---|
| 3,399,259 | 8/1968 | Brayford | 161/173 X |
| 3,509,013 | 4/1970 | Oppenlander | 161/173 |
| 3,533,904 | 10/1970 | Jurkiewitsch | 161/173 |

FOREIGN PATENTS OR APPLICATIONS 979,083  1/1965  Great Britain

Primary Examiner—Robert F. Burnett
Assistant Examiner—Raymond O. Linker, Jr.
Attorney—Fred C. Philpitt

[57] ABSTRACT

These crimpable, coloured polypropylene composite fibers have such a structure that the first portion consisting of polypropylene having a high degree of polymerization and containing pigment and the second portion consisting of polypropylene having a low degree of polymerization and an intrinsic viscosity of 1.35 or less and being substantially free of a pigment, are joined together in an asymmetrical relation with respect to the fiber axis.

Yarns of a high bulkiness, a high elongation and shrinkage and good touch can be prepared from the present composite fibers.

10 Claims, 4 Drawing Figures

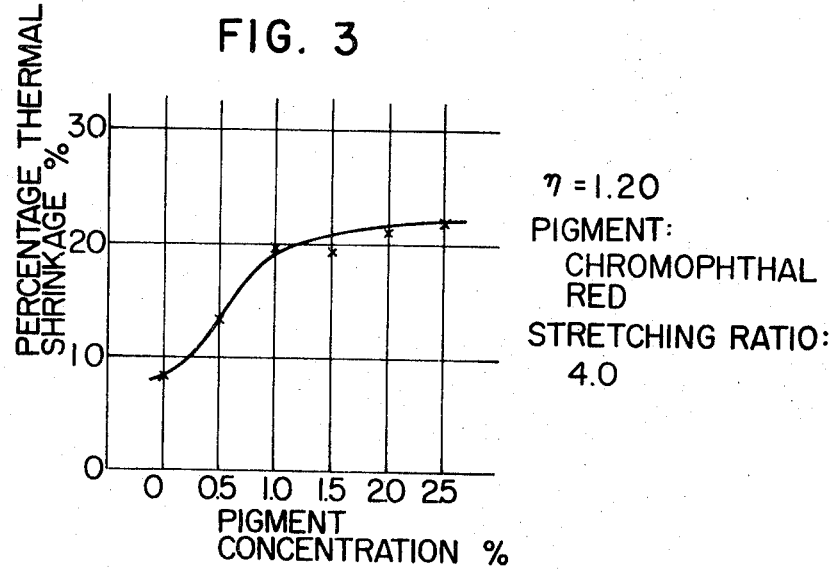
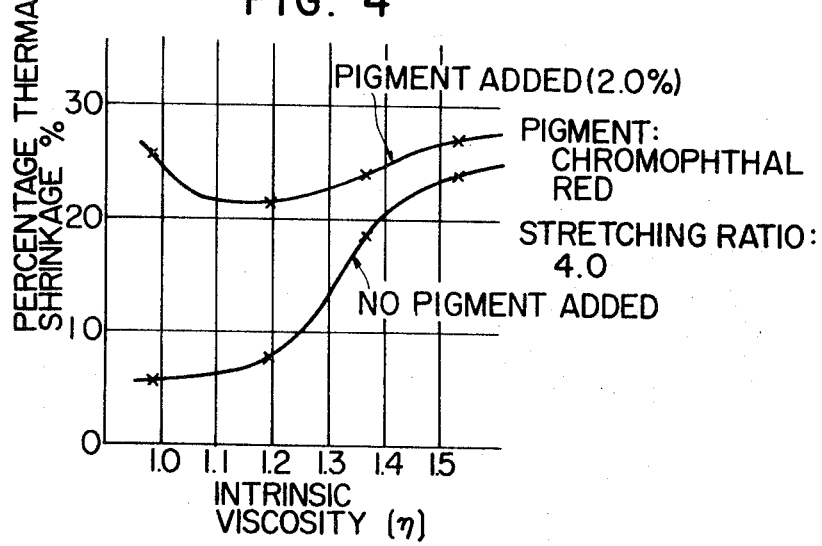

CRIMPABLE, COLORED POLYPROPYLENE COMPOSITE FIBERS

DESCRIPTION

The present invention relates to polypropylene fibers having a high crimpability, and also to fibers from coloured resin as raw materials.

It is the ordinary practice for obtaining fibers having crimpabilities to spin fibers having such a structure that plural portions of different phases are joined together (which will be hereinafter referred to as "composite fibers."

It is known that the fibers prepared from such olefine polymers as polyethylene, polypropylene, etc. are very hard to undergo dyeing, because the fiber-constituting polymer molecules are hard to combine with a dyestuff or many polymer molecules are in crystalline forms.

In order to prepare olefine polymer fibers having deep colours, fibers are frequently spun from raw material resins containing pigments.

The present invention concerns composite fibers prepared from special polypropylene resins containing pigments.

The composite fibers of the present invention consist of two layers. These layers extend in parallel with the direction of fiber length. Furthermore, these layers are in a side by side or sheath and core in an asymmetrical relation with respect to the fiber axis.

One layer consists of polypropylene resin of high degree of polymerization containing pigments. Other layer consists of polypropylene resin of low degree of polymerization substantially free of a pigment. In this case, the resin substantially free of a pigment means not only the resin quite free of the pigment, but also the resin containing a small amount (not exceeding about 0.5 percent by weight) of the pigment.

The staple fibers or long fibers of the present invention can be used in spinning. Further, these fibers can be spun together with other kinds of fibers.

By subjecting the yarns obtained by spinning to an action of hot steam, yarns having high elongation and shrinkage, a high bulkiness and a good feeling can be prepared. Pile fabrics, carpet, sweater, socks, etc. having special excellent properties can be prepared from these yarns.

The fibers of the present invention have a percentage shrinkage of 20 percent or more.

The percentage shrinkage is determined in the following manner. The fibers of the present invention are stretched, cut to a length of 51 mm. and formed into carded slivers having a thickness of about 60 grain / yard by means of a carding machine. After the slivers have been left standing for 24 hours, they are heated to 100° C. for one hour and shrinkage of the slivers are measured. The shrinkage does not show reduction in actual length of the fibers, but shows an apparent shrinkage of the slivers.

The apparent shrinkage of the slivers is due to the curling or crimping of the fibers into a fine wave or coil state.

The pile fabric prepared from the fibers having a percentage shrinkage of less than 20 percent has none of special excellent properties.

In the present invention, composite fibers consisting of two layers are prepared by spinning two kinds of polypropylene having different degrees of polymerization in combination. Same polypropylenes may be modified into two kinds of polypropylenes having different degree of polymerization by applying different spinning conditions or different thermal decomposition conditions to these same polypropylenes during the spinning steps.

Greater effect can be obtained when polypropylene having an intrinsic viscosity of 1.35 or less is used as a resin constituting the one layer of the fiber. The intrinsic viscosity is a value measured in tetraline at 135° C. The reason is that the percentage heat shrinkage of the fibers of polypropylene having an intrinsic viscosity of 1.35 or less, which is free of pigments, is smaller. This will be illustrated referring to the FIG. 4. In FIG. 4 the relationship between the percentage heat shrinkage of polypropylene fibers and intrinsic viscosity of polypropylene is shown, referring to comparison of the case where a pigment is added, with the case where no pigment is added.

FIG. 1 shows a relationship between percentage elasticity recovery and stretching ratio of polypropylene fibers and a relationship between percentage heat shrinkage and the stretching ratio. These relations were obtained from the tensile stretching test of the polypropylene fibers. The test was carried out at room temperature. Test specimens were the fibers of polypropylene having an isotactic index of 99.5 percent and intrinsic viscosity of 1.54, and of polypropylene having an intrinsic viscosity of 1.20. The percentage heat shrinkage was values that were obtained when the fibers were heated at 100° C. for 1 hour. By stretching composite fibers prepared from polypropylene having an intrinsic viscosity of 1.54 and polypropylene having an intrinsic viscosity of 1.20 and removing the applied force therefrom, crimps develop due to different percentage tensile elasticity recoveries of the individual portion of the fibers. Furthermore, since the percentage heat shrinkages of the individual portion of the fibers are also different, the developed crimps are made denser by heat-treating the stretch fibers.

Figure 2:
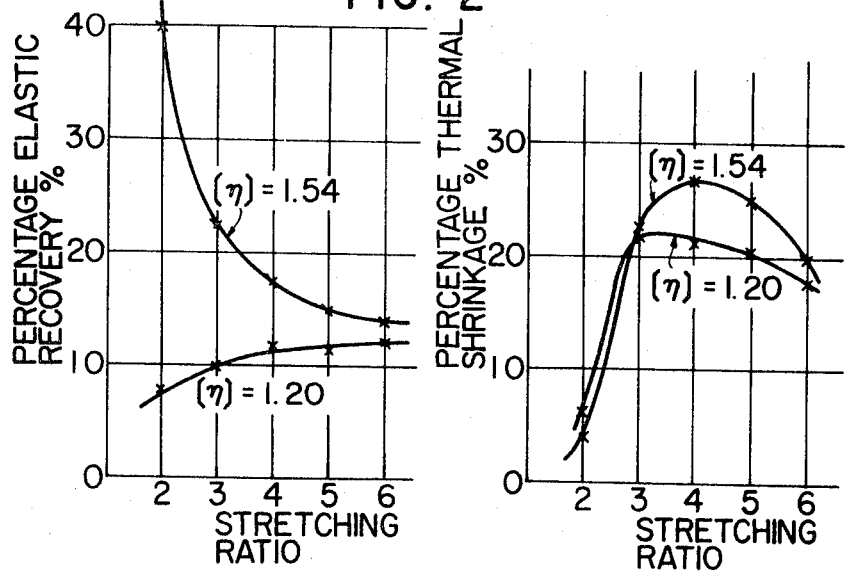

FIG. 2 shows relationship between percentage elasticity recovery and percentage heat shrinkage of the fibers prepared from polypropylene containing 2 percent by weight of chromophthal red. The polypropylene fibers having an intrinsic viscosity of 1.20 and containing no pigment have a small, constant percentage heat shrinkage irrespective of the stretching ratio. Whereas, the polypropylene fibers containing a pigment has a percentage heat shrinkage which will greatly change with change in the stretching ratio. When the pigment is contained, the difference in percentage heat shrinkage between the fibers of polypropylene having an intrinsic viscosity of 1.20 and that having an intrinsic viscosity of 1.54 is relatively small. The composite fibers obtained from two kinds of polypropylenes having small differences in percentage heat shrinkage are not so well crimped even by heat-treating the composite fibers. Thus, in the present invention, in order to obtain highly crimped fibers, composite fibers are prepared from the polypropylene having a low degree of polymerization and containing not so much pigment as to give a great influence to the percentage heat shrinkage of the fibers, and the polypropylene having a high degree of polymerization and a sufficient amount of the pigment in combination.

FIG. 3 shows that the percentage heat shrinkage of the fibers of polypropylene resin having a pigment concentration of 0.5 percent by weight or less is about 10 percent at most. The pigment particles act as nuclei and many small spherulitic crystals of polypropylene are formed and the density of the polypropylene is increased. As a result, it is presumed that the heat shrinkage of the polypropylene fibers is influenced thereby.

FIG. 4 shows that the percentage heat shrinkage of the fibers of polypropylene having a low intrinsic viscosity is much more influenced by the pigment than that of the fibers of polypropylene having a high intrinsic viscosity. It is presumed that, since the polypropylene having a low degree of polymerization is more readily crystallized than that having a high degree of polymerization, the percentage heat shrinkage of the fibers of polypropylene having a low intrinsic viscosity is greatly influenced by the pigment.

Titanium oxide, iron oxide, cadmium compounds, carbon black, ultramarine, phthalocyanine pigments, quinacridone pigments, azo pigments, etc. can be used in the present invention. Organic pigments give greater influence to the percentage heat shrinkage of the polypropylene fibers than inorganic pigments, but crimped fibers can be prepared even by using inorganic pigments.

Fibers having a good hue can be obtained by using transparent polypropylene having a low degree of polymerization as one of two kinds of the resins constituting the composite fibers. When the present composite fibers are prepared by using by several percent more pigment than the amount of the pigment used in preparing the ordinary colored fibers, the composite fibers having a color at the same depth as that of the ordinary fibers prepared from the raw material resin containing the pigment, can be prepared.

EXAMPLE 1.

Composite fibers having such a structure that a layer (I) of polypropylene having an intrinsic viscosity of 1.54 and a layer (II) of polypropylene having an intrinsic viscosity of 1.20, the layers containing phthalocyanine blue in ratio as shown in Table 1, were joined in a side by side relation from the viewpoint of the direction of fiber length, in a ratio by weight of 1 - 1, were prepared.

The fibers thus prepared were 3.5 times stretched at a stretching speed of 80 m./min. and a temperature of 25° C. The slivers of the fibers thus stretched had the percentage shrinkage as shown in Table 1.

The fibers of specimen A had a fineness of 5.6 denier, a twist of 16 turns per inch of apparent length of the fibers, a tensile strength of 3.25 g./d. and an elongation of 88.2 percent.

The hue of the fibers of specimen A was somewhat duller than that of the fibers of specimen B. The hue of these two fibers become almost equal when heated to 100° C. for ten minutes.

The polypropylenes used had an isotactic index of 99.3 percent.

TABLE 1

| Specimen | Pigment Content (%) | | Percentage shrinkage of slivers (%) |
|---|---|---|---|
| | Layer (I) | Layer (II) | |
| A | 2.5 | 0 | 36.7 |
| B | 1.25 | 1.25 | -8.7 |
| C | 0 | 2.5 | -2.7 |
| D | 0 | 0 | 34.7 |

EXAMPLE 2

Composite fibers having such a structure that a layer (I) of polypropylene having an intrinsic viscosity of 1.49 and a layer (II) of polypropylene having an intrinsic viscosity of 1.15, the layers containing chromophthal red in ratios as shown in Table 2, were joined together in a side by side relation from the view-point of the direction of fiber length in a ratio by weight of 1 - 1, were prepared.

The fibers thus prepared were 3.3 times stretched at a stretching speed of 100 m/min. and a temperature of 40° C. The slivers of the fibers thus stretched had the percentage shrinkages as shown in Table 2.

The fibers of specimen E had a tensile strength of 3.11 g./d, an elongation of 95.2 percent and a fineness of 6.1 denier. The hue of the fibers of specimen E was almost equal to that of specimen F.

TABLE 2

| Specimen | Pigment Content (%) | | Percentage shrinkage of slivers (%) |
|---|---|---|---|
| | Layer (I) | Layer (II) | |
| E | 2.0 | 0 | 32.8 |
| F | 1.0 | 1.0 | 4.0 |
| G | 0 | 2.0 | 8.8 |

A 102 mm. long sliver was prepared from a bundle of fibers of 70,000 denier, consisting of fibers of specimen E. Yarns of 2/36 yarn number counts were prepared by mix-spinning this sliver and polypropylene fibers of 3 d. × 89 mm. in a ratio by weight of 1 - 1. The yarns thus prepared were heated for 10 minutes with steam at 105° C. The yarns thus obtained had a shrinkage of 25.3 percent, elongation of 28.3 percent and an elasticity of 79.3 percent. The yarns were bulky yarns of 2/27 yarn number counts. A sweater was knitted using three of these yarns. The sweater had excellent bulkiness, a high elongation and shrinkage, and a good feeling.

What is claimed is:

1. Crimpable, coloured polypropylene composite fibers having such a structure that the first portion of polypropylene having an intrinsic viscosity of 1.49 or more and containing pigment which consists of one or two pigments selected from the group of phthalocyanine blue and chromophthal red and the second portion of polypropylene having an intrinsic viscosity of 1.20 or less and being substantially free of a pigment, are joined together in a side by side relation from the view point of the direction of the fiber length.

2. Crimpable, colored polypropylene composite fibers having such a structure that the first portion of polypropylene has a high degree of polymerization and contains pigments and the second portion of polypropylene has a low degree of polymerization and an intrinsic viscosity of 1.35 or less as measured in tetraline at 135° C. and is substantially free of a pigment, and wherein the intrinsic viscosity of the polypropylene having a high degree of polymerization is greater than the intrinsic viscosity of the polypropylene having a low degree of polymerization, and such a structure that the first and second portions are joined together in an asymmetrical relationship with respect to the fiber axis.

3. The composite fibers of claim 2 wherein said second portion of polypropylene has an intrinsic viscosity of 1.20 or less as measured in tetraline at 135° C.

4. The composite fibers of claim 2 wherein the pigment is selected from the group consisting of titanium oxide, iron oxide, cadmium compounds, ultramarine, carbon black, phthalocyanine pigments, quinacridone pigments, azo pigments, and mixtures thereof.

5. The composite fibers of claim 2 wherein said first portion of polypropylene has an intrinsic viscosity of 1.49 or more as measured in tetraline at 135° C.

6. The composite fibers of claim 5 wherein said second portion of polypropylene has an intrinsic viscosity of 1.20 or less as measured intetraline at 135° C.

7. The composite fibers of claim 2 wherein said pigment is an organic pigment.

8. The composite fibers of claim 2 wherein said pigment is present in an amount of about 2 percent by weight.

9. The composite fibers of claim 8 wherein said pigment is an organic pigment.

10. The composite fibers of claim 2 wherein said pigment is an inorganic pigment.

* * * * *